United States Patent
McCormack et al.

(10) Patent No.: US 7,050,051 B1
(45) Date of Patent: May 23, 2006

(54) PARAMETRIC SHAPE GRAMMAR INTERPRETER

(75) Inventors: Jay P. McCormack, Pittsburgh, PA (US); Jonathan Cagan, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 0 days.

(21) Appl. No.: 09/493,903

(22) Filed: Jan. 28, 2000

(51) Int. Cl.
*G06T 17/00* (2006.01)

(52) U.S. Cl. ...................... 345/420; 345/423

(58) Field of Classification Search .......... 345/419, 345/420, 421, 423, 427, 428, 619, 643, 645, 345/646; 382/181
See application file for complete search history.

(56) References Cited

U.S. PATENT DOCUMENTS

| | | | |
|---|---|---|---|
| 5,133,052 A * | 7/1992 | Bier et al. ............ | 715/530 |
| 5,280,530 A * | 1/1994 | Trew et al. ........... | 382/103 |
| 5,325,475 A * | 6/1994 | Poggio et al. ......... | 345/475 |
| 5,379,371 A * | 1/1995 | Usami et al. .......... | 345/428 |
| 5,590,261 A * | 12/1996 | Sclaroff et al. ....... | 345/473 |
| 5,636,297 A * | 6/1997 | Eller et al. ........... | 382/293 |
| 5,801,711 A * | 9/1998 | Koss et al. ........... | 345/441 |
| 5,870,106 A * | 2/1999 | Langelaan ............ | 345/441 |
| 5,929,865 A * | 7/1999 | Balz et al. ........... | 345/441 |
| 5,999,944 A * | 12/1999 | Lipkin ............... | 707/104.1 |
| 6,091,420 A * | 7/2000 | Horikawa et al. ...... | 345/419 |
| 6,118,897 A * | 9/2000 | Kohno ............... | 382/190 |
| 6,191,787 B1 * | 2/2001 | Lu et al. ............. | 345/418 |
| 6,219,056 B1 * | 4/2001 | Felser et al. ......... | 345/848 |
| 6,292,197 B1 * | 9/2001 | Langelaan ............ | 345/621 |
| 6,356,272 B1 * | 3/2002 | Matsumoto et al. .... | 345/582 |
| 6,396,952 B1 * | 5/2002 | Horikawa et al. ...... | 382/203 |
| 6,512,519 B1 * | 1/2003 | Arsenault et al. ..... | 345/441 |

OTHER PUBLICATIONS

Agarwal et al. "A blend of different tastes: the language of coffeemakers," *Environment and Planning B: Planning and Design*, 1998, vol. 25, pp. 205–226.

Agarwal et al., "A Micro Language: Generating MEMS Resonators using a Coupled Form–Function Shape Grammar," Accepted, *Environment and Planning B: Planning and Design*, 1999.

Chiou et al., "The grammar of Taiwanese traditional vernacular dwellings," *Environment and Planning B: Planning and Design 1995*, vol. 22, pp. 689–720.

Hanson et al., On Modeling the Work of the Architect Glenn Murcutt, *Design Computing*, vol. 1, pp. 189–203 (1986).

Chiou et al., "The grammatical basis of Chinese traditional architecture", *Languages of design, Formalisms for Word, Image and Sound*, 1995, pp. 5–31.

Knight, The generation of Hepplewhite–style chair–back designs, *Environment and Planning B*, 1980, vol. 7, pp. 227–238.

Stiny, "Kindergarten grammars: designing with Froebel's building gifts", *Environment and Planning B*, 1980, vol. 7, pp. 409–462.

Fleming, "The Role of Shape Grammars in the Analysis and Creation of Designs," chap. 12, pp. 245–272, *Computability of Design*, Kalay et al, ed., 1987.

(Continued)

Primary Examiner—Mark Zimmerman
Assistant Examiner—Enrique L Santiago
(74) Attorney, Agent, or Firm—Thorp Reed & Armstrong, LLP

(57) ABSTRACT

A method of recognizing a first shape in a second shape. The method includes decomposing the first shape into at least one subshape belonging to one of a plurality of subshape groups, and searching the second shape for a parametric transformation of the subshape.

34 Claims, 12 Drawing Sheets

OTHER PUBLICATIONS

Chien, Sheng–Fen, et al., "SG–Clips : A System to Support the Automatic Generation of Designs From Grammars", *Third Conference on Computer Aided Architectural Design Research in Asia*, Apr. 22–24, 1998, pp. 445–454.

Cagan et al., "Optimally directed shape generation by shape annealing", *Environment and Planning B: Planning and Design*, 1993, vol. 20, pp. 5–12.

Krishnamurti et al., "Spatial Grammars: Motivation, Comparison, and New Results", *CAAD Futures '93*, U. Flemming and S. VanWyk (Editors), 1993, Elsevier Science Publishers B.V., pp. 57–74.

Krishnamurti, R., "The maximal representation of a shape", *Environment and Planning B: Planning and Design*, 1992, vol. 19, pp. 267–288.

Krishnamurti, R., et al., "Shape recognition in three dimensions", *Environment and Planning B: Planning and Design*, 1992, vol. 19, pp. 585–603.

Krishnamurti, R., et al., "Spatial change: continuity, reversibility, and emergent shapes", *Environment and Planning B: Planning and Design*, 1997, vol. 24, pp. 359–384.

Krishnamurti, R., "The arithmetic of maximal planes", *Environment and Planning B: Planning and Design*, 1992, vol. 19, pp. 431–464.

Gips, J., et al., "Production systems and grammars: a uniform characterization", *Environment and Planning B: 1980*, vol. 7, pp. 399–408.

Stiny, George, "A New Line on Drafting Systems", *Design Computing*, vol. 1, pp. 5–19 (1986).

Stiny, George, "The Algebras of Design", *Research in Engineering Design*, 1991, pp. 171–181.

Stiny, George, "Weights", *Environment and Planning B: Planning and Design*, 1992, vol. 19, pp. 413–430.

Brown, Ken, "Grammatical Design", *IEEE Expert*, Mar.–Apr. 1997, pp. 27–33.

Stiny, G., "Introduction to shape and shape grammars", *Environment and Planning B*, 1980, vol. 7, pp. 343–351.

Krishnamurti, R., "The construction of shapes", *Environment and Planning B*, 1981, vol. 8, pp. 5–40.

Krishnamurti, R., "The arithmetic of shapes", *Environment and Planning B*, 1980 vol. 7, pp. 463–484.

Krishnamurti et al., "Shape recognition in three dimensions", *Environment and Planning B: Planning and Design*, 1992 vol. 19 pp. 585–603.

Shea et al., "Innovative dome design: Applying geodesic patterns with shape annealing", *Artificial Intelligence for Engineering Design, Analysis and Manufacturing* (1997), 11, pp. 379–394.

Piazzalunga et al., "Note on a three–dimensional shape grammar interpreter", *Environment and Planning B: Planning and Design*, 1998, vol. 25, pp. 11–30.

Chase, "Shapes and shape grammars: from mathematical model to computer implementation", *Environment and Planning B: Planning and Design*, 1989, vol. 16, pp. 215–242.

Stiny, G., "Ice–ray: a note on the generation of Chinese lattice designs", *Environment and Planning B*: 1977, vol. 4, pp. 89–98.

Stiny, G., "The Palladian grammar", *Environment and Planning B*: 1978, vol. 5, pp. 5–18.

Stiny, G., et al., "The grammar of paradise: on the generation of Mughul gardens", *Environment and Planning B*: 1980, vol. 7, pp. 209–226.

Flemming, U., "More than the sum of parts: the grammar of Queen Anne houses", *Environment and Planning B: Planning and Design*, 1987, vol. 14, pp. 323–350.

Koning, H., et al., "The language of the prairie: Frank Lloyd Wright's prairie houses", *Environment and Planning B*, 1981, vol. 8, pp. 295–323.

Agarwal, M., et al., "A blend of different tastes: the language of coffeemakers", *Environment and Planning B: Planning and Design*, 1977, vol. 24, pp. 1–22.

Tapia, M., "A visual implementation of a shape grammar system", *Environment and Planning B: Planning and Design 1999*, vol. 26, pp. 59–73.

Mitchell, "Functional Grammars: an introduction", *Reality and Virtual Reality*, 1991, pp. 167–176.

Cagan, "Engineering Shape Grammars: Where are we and where are we going?", *NSF Workshop on Shape Computation at MIT*, Apr. 25 and 26, 1999.

Stiny, "Two excercises in formal composition," *Environment and Planning B*, 1976, vol. 3, pp. 187–210.

Stouffs et al., "Constructing the boundary of a shape," 1997.

Stouffs et al., "The boundary of a shape," 1997.

Stouffs et al., "Classifying the boundary of a shape," 1997.

Stouffs et al., "A note on the computational complexity with the boundary of a shape," 1997.

Gips, "Computer Implementation of Shape Grammars," *NSF Workshop on Shape Computation at MIT*, Apr. 25 and 26, 1999.

Chiou et al., "Unraveling feng–shui," *Environment and Planning B: Planning and Design*, 1997, vol. 24, pp. 549–572.

Chiou et al., "The fortunate dimensions of Taiwanese traditional architecture," *Environment and Planning B: Planning and Design*, 1995, vol. 22, pp. 547–562.

Chiou et al., "Example Taiwanese traditional houses," *Environment and Planning B: Planning and Design*, 1996, vol. 23, pp. 191–216.

Chiou et al., "A Grammar of Taiwanese Temples," data unknown.

* cited by examiner

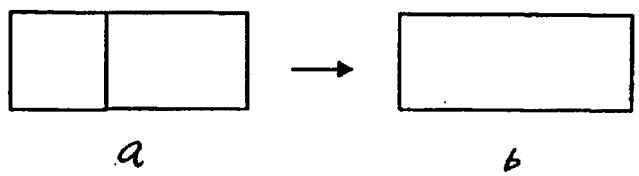
a　　　　　　　　b　　　　　Fig. 12
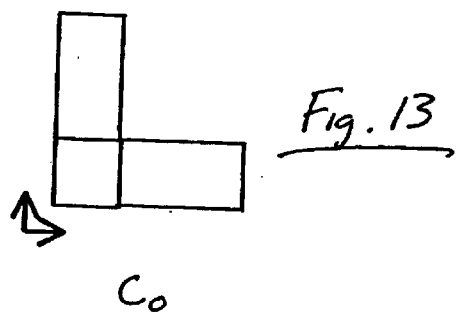
Fig. 13
$C_o$
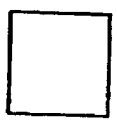
s1
Fig. 14
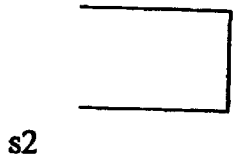
s2
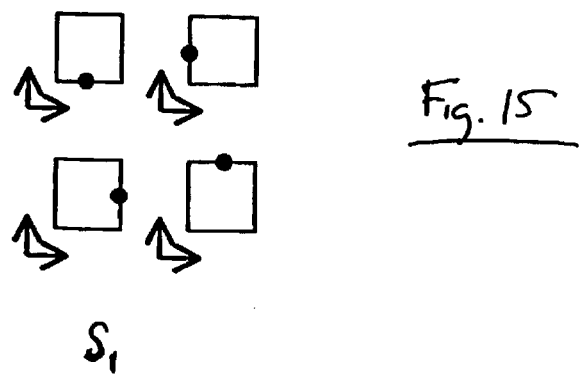
Fig. 15
$S_1$ $C_1$ $S_1 + S_2$

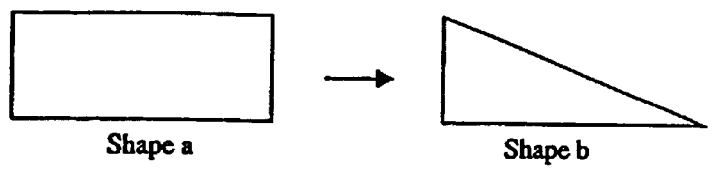
Fig. 20
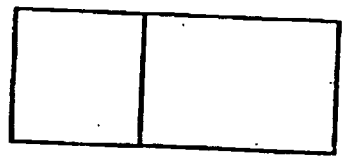
Fig. 21
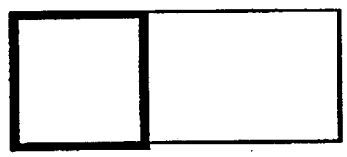
Fig. 22

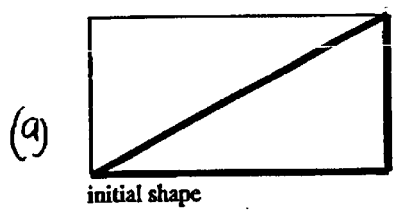
(a) initial shape
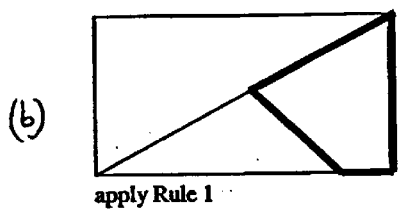
(b) apply Rule 1
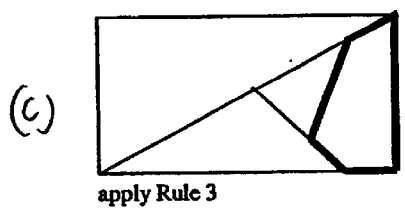
(c) apply Rule 3
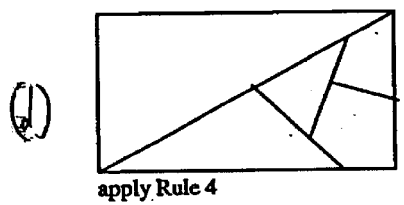
(d) apply Rule 4
Fig. 26
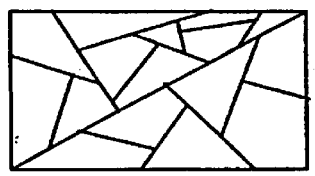
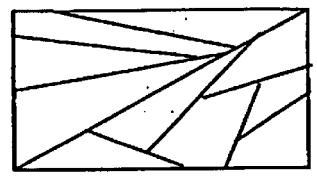
Fig. 27

PARAMETRIC SHAPE GRAMMAR INTERPRETER

STATEMENT REGARDING FEDERALLY SPONSORED RESEARCH OR DEVELOPMENT

Certain of the research leading to the present invention was sponsored by the United States National Science Foundation under contract No. DMI-9713782. The United States Government may have rights in the invention.

CROSS-REFERENCE TO RELATED APPLICATIONS

Not Applicable.

BACKGROUND OF INVENTION

1. Field of Invention

The present invention relates generally to shape grammars and, more particularly, to shape grammar systems and methods having parametric shape recognition.

2. Description of the Background

A shape grammar is a set of rules, based on shape, that is used to generatedesigns through rule applications. Rules take the form of a→b, where a and b both denote shapes. A rule is applicable if the left-hand shape, a, can be found in the design shape, denoted c. If the rule is applied, the left hand shape is subtracted from the design and the right-hand shape is added to the design, denoted c−τ(a)+τ(b), where shapes a and b undergo a transformation τ according to the transformation required to make shape a a subshape of shape c.

Shape grammars, having their roots in architecture literature, have recently found application in engineering, such as in the design of coffeemakers, lathe process plans, roof trusses, and microelectromechanical systems (MEMS) resonators. Shape grammars may be conceptualized of as a type of expert system based on geometry. Shape grammars, however, have succeeded in engineering applications where traditional expert systems have failed because of: (i) their direct handing of reasoning about geometry; (ii) their ability to operate on a parametric geometric representation; and (iii) their ability to support emergence of shape. These advantages presage a future in which shape grammars play an increasingly larger role in engineering design in comparison with the traditional expert systems.

In the past, however, shape grammars have been limited by the difficulty and time intensity in their implementations. Implementations have not allowed for general parametric shape recognition. Engineering shape grammars in particular have been restricted to limited, non-parametric shape recognition and often are hard-coded. These drawbacks minimize much of the beneficial potential of shape grammars.

Accordingly, there exists a need for a shape grammar system that uses shape recognition to provide, for example, an automated approach to product generation. There further exists a need for a shape grammar system in which engineering knowledge (geometry-based and otherwise) may be incorporated into implementation design rules in order to drive design exploration and the generation of designs toward a desired end.

BRIEF SUMMARY OF INVENTION

The present invention is directed to a method of recognizing a first shape in a second shape. According to one embodiment, the method includes decomposing the first shape into at least one subshape belonging to one of a plurality of subshape groups, and searching the second shape for a parametric transformation of the subshape.

According to another embodiment, the present invention is directed to a shape grammar interpreter, including a shape decomposition module, and a shape recognition module in communication with the shape decomposition module.

The present invention allows for shape grammars, including engineering shape grammars, to be implemented in a fraction of the time that it currently takes to hard code them. Consequently, the present invention allows shape grammars to be adjusted, fine tuned, and adapted to the changing design scenario presented to the rule writer. The shape grammar interpreter of the present invention therefore possesses the features desired in an engineering grammar implementation, including general parametric shape recognition, providing designers with the possibility of exploring the promising potential of engineering shape grammar systems. These and other benefits of the present invention will be apparent from the detailed description hereinbelow.

DESCRIPTION OF THE FIGURES

For the present invention to be clearly understood and readily practiced, the present invention will be described in conjunction with the following figures, wherein:

FIGS. 12–19 are diagrams illustrating a method of parametric shape recognition according to one embodiment of the present invention;

FIGS. 20–23 are diagrams illustrating a method of using parametric shape recognition to apply a given shape grammar rule to a given initial design shape according to one embodiment of the present invention; and FIGS. 24–27 are diagrams illustrating a method of using parametric shape recognition to apply a set of shape grammar rules to a given initial design shape according to another embodiment of the present invention.

DETAILED DESCRIPTION OF THE INVENTION

Figure 1:
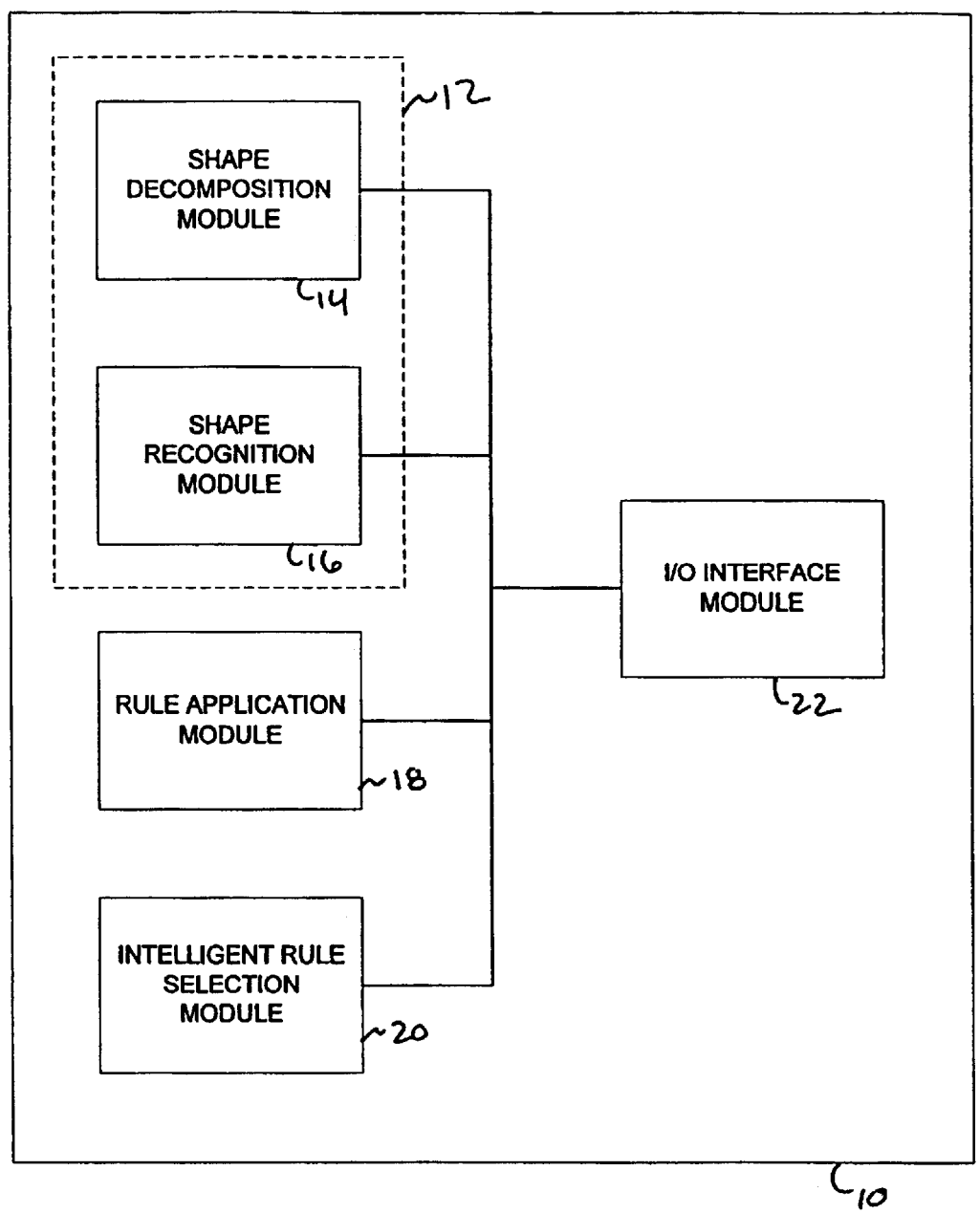
FIG. 1 is a block diagram of a shape grammar system according to one embodiment of the present invention.

FIG. 1 is a block diagram of a shape grammar system 10 according to one embodiment of the present invention. The shape grammar system 10 includes a parametric shape grammar interpreter 12, including a shape decomposition module 14 and a shape recognition module 16. The shape grammar system 10 also includes a rule application module 18 and an intelligent rule selection module 20, which are in communication with the parametric shape grammar interpreter 12. The shape grammar system 10 may also include an input/output (I/O) interface module 22, as illustrated in FIG. 1. The shape grammar system 10, as described hereinbelow, may be used to implement, for example, architectural shape grammars, engineering shape grammars, and industrial design shape grammars, with parametric shape recognition. The parametric shape grammar interpreter 12 will be described herein as being used to recognize the left-hand shape of a shape grammar rule in the initial design shape(s) through the steps of decomposing the shape into subshapes and progressively searching for parametric transformations of those subshapes, however, it should be recognized that the benefits of the present invention may be realized in any application requiring parametric shape recognition, and is not limited to shape grammar applications.

The system 10 may be implemented using, for example, a computer, such as a workstation or a personal computer, a microprocessor, or an application specific integrated circuit (ASIC). The modules 14, 16, 18, 20, and 22 may be implemented as software code to be executed by the system 10 using any type of computer instruction type suitable such as, for example, microcode, and can be stored in, for example, an electrically erasable programmable read only memory (EEPROM), or can be configured into the logic of the system 10. According to another embodiment, the modules 14, 16, 18, 20, and 22 may be implemented as software code to be executed by the system 10 using any suitable computer language such as, for example, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

The parametric shape grammar interpreter 12 may perform the operations necessary to determine whether any of a predefined set of shape grammar rules may be applied to a particular shape (or set of shapes). In addition, the interpreter 12 may determine how a particular rule may be applied to the shape(s). As described hereinbelow, the interpreter 12 may perform these operations by decomposing, for example, the left-hand shape of a shape grammar rule into a group of subshapes, thereby allowing for any part of the shape to be transformed with any possible transformation, although, as discussed hereinbefore, it is not limited to such shapes. The interpreter 12 may perform these operations with respect to, for example, a left-hand shape of a rule having one-dimensional, two-dimensional or three-dimensional shapes. In addition, the left-hand shape may include, for example, straight line segments, curved line segments, planes, or three-dimensional objects. Once the interpreter 12 determines whether a rule may be applied and how to apply the rule, whether the rule should be applied to the shape may be determined, for example, by a user of the system 10 or the intelligent rule selection module 20. The rule application module 18 may then apply the rule to the shape if so determined.

The shape decomposition module 14 decomposes a shape such as, for example, the left-hand shape of a rule (the shape a in the rule a→b ) into a group of subshapes contained in the shape. The groups may be defined such that subshapes belonging to different groups do not share, for example, line segments for two-dimensional shapes. The group of shapes may be ordered according to a hierarchy of, for example, decreasing restrictions or constraints for more efficient searching, as described hereinbelow, although it is not necessary for the subshape groups to be so ordered.

For an embodiment in which the subshape groups are ordered according to a hierarchy of decreasing constraints, the basis of the hierarchy of constraints may be, for example, defined by the designer or it may be a default hierarchy. A default hierarchy may be designed, for example, to interpret the designer's intentions and preferences through particular features present in a shape which defines part of a shape grammar rule. For example, the default hierarchy may be intended to separate the parts of the left-hand shape of the rule that the designer specified exactly from the parts of the shape that were intended as a general scheme.

For example, in defining a default hierarchy for an embodiment in which the left-hand shapes of the predefined shape grammar rules include shapes having straight lines in a single plane, it is recognized that there is a limited set of transformations that can be applied to the shapes, such as translation, rotation, scaling (isotropic and anisotropic), and shearing. Of the possible transformations, some will destroy certain features of the shape and some will not. For example, no amount of translation or rotation will destroy a specific feature such as, for example, a right angle, a square, or an equilateral triangle. Shearing, however, will eliminate perpendicular intersections and symmetry in a two-dimensional shape. In addition, anisotropic scaling will also destroy symmetry unless the scaling is along or perpendicular to the line of symmetry. Isotropic scaling, on the other hand, does not affect the symmetry of a shape.

In view of the properties of these transformations, an example of a default hierarchy of subshapes may be defined as follows:

TABLE 1

| Subshape Group | Features | Transformations |
|---|---|---|
| $s_1$ | 1) lines that intersect perpendicularly and are the same length<br>2) lines that are symmetric to more than one lines that are not parallel | translation, rotation, isotropic scaling |
| $s_2$ | 1) lines that intersect perpendicularly<br>2) lines that are symmetric to one line or<br>3) more than one lines that are parallel | translation, rotation, anisotropic scaling |
| $s_3$ | intersecting lines | translation, rotation, anisotropic scaling, shearing |
| $s_4$ | none | all |

According to such a default hierarchy, subshape group $s_1$ consists of the most constrained lines. Group $s_1$ contains the line segments that intersect perpendicularly and are the same length. Additionally, the $s_1$ group also contains any line segment that is symmetric to two or more other line segments which are not parallel. Two examples of lines that meet the symmetry criteria of group $s_1$ are the sides of a square and the legs of an equilateral triangle.

Group $s_2$ consists of the next most constrained lines, containing line segments that intersect perpendicularly. Any line segment that is symmetric to another line segment is also included in group $s_2$. Accordingly, group $s_1$ is a subset of group $s_2$. Some examples of $s_2$ lines that are not also in group $s_1$ include the sides of a rectangle and the two equal legs of an isosceles triangle.

Figure 2:
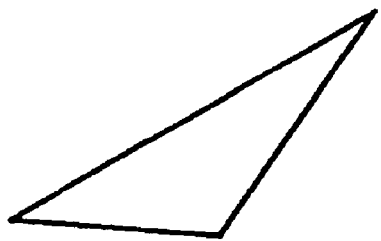
FIGS. 2 and 3 are diagrams of examples of line segments belonging to subshape groups according a default hierarchy of subshape groups according to one embodiment of the present invention.

Group $s_3$ contains the line segments that intersect. Thus, subshape groups $s_1$ and $s_2$ are subsets of $s_3$. An example of three lines that are in group $s_3$ and not $s_1$ or $s_2$ are the three line segments that make up the triangle illustrated in FIG. 2.

Figure 3:
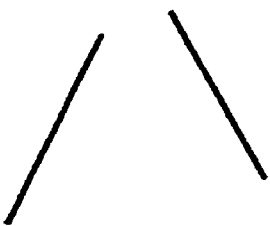

The line segments in group $s_4$ have no discernible spatial relationship to any other line segments. Thus, the line segments in group $s_4$ are essentially those not found in $s_1$, $s_2$, and $s_3$. An example of line segments that may be found in group $s_4$ are illustrated in FIG. 3.

The above-described default hierarchy is but one example of a hierarchy of subshapes ordered by decreasing constraints. According to other embodiments of the present invention, the shape decomposition module 14 may search the left-hand shape of a rule according to such other subshape hierarchies. Such other hierarchies, as described hereinbefore, may be defined by a user of the system 10, or may be a default hierarchy making different assumptions about the intent of the designer through particular features present in a shape which defines part of a shape grammar rule. For example, according to one embodiment, the hierarchy may be based on an assumption that the intersection of line segments at, for example, a right angle, is intended to represent a specific design choice, and the intersection of line segments at an angle other than a right angle is intended to represent a general scheme. According to other embodiments, the hierarchy may be based on an assumption that the intersection of line segments at, for example, sixty degrees, is intended to represent a specific design choice, and the intersection of line segments at an angle other than sixty degrees is intended to represent a general scheme.

The shape recognition module 16 searches a shape, or a set of shapes, for the subshapes belonging to the subshape groups according to the transformations appropriate for that group. According to one embodiment, parametric shape recognition may be accomplished by the shape recognition module 16 by repeating a three-step process for each of the subshape groups of the decomposed left-hand shape of a rule. The three steps of the process may include: 1) finding subshapes in the design shape, 2) subtracting the subshapes from the design shape, and 3) identifying the connectivity between the subshape and the design shape and between the subshapes of successive subshape groups by, for example, marking points of intersection with labels or weights to a) the overlapping points of the decomposed left-hand shapes and also to b) points in the design equal in location to the transformed, identified points in the decomposed left-hand side shape. The process is begun with a first of the subshape groups, and progressively repeated for the others. According to one embodiment, the subshape groups are of a hierarchical order of decreasing constraints, and the process is started with the most constrained group and progressively repeated with the next most constrained subshape group. Such an embodiment generally yields more efficient searching.

For example, according to such an embodiment the initial design shape is first searched for subshapes belonging to the most constrained group. The subshape matches, found by applying the transformations appropriate for that group, are defined as a set S. The subshapes in the set S are each subtracted from the initial design shape, producing another set of shapes, denoted as the set C. According to one embodiment, the subshapes of a decomposed shape will overlap each other, if at all, only at points because the definition of the hierarchical groups may require that the subshapes share no line segments. Thus, in order to maintain the connectivity, and hence orientation, of the subshapes, the connectivity between the shapes of sets S and C is identified and maintained. The connectivity may be maintained, for example, by identifying with labels or weights the overlapping points of the decomposed left-hand shapes and the points in the initial design corresponding to the location of the transformed, identified points in the decomposed left-hand shape.

The shape recognition module 16 may repeat this process for all of the subshape groups. The shape recognition process may end when all of the decomposed parts of the left-hand shape have been found or when one of the shape searches finds no subshapes. The shape recognition module 16 may then add each of the shapes, maintaining the connectivity between the shapes, for each of the subshape groups found in the original shape to recognize the occurrences of the left-hand shape of the rule in the original design shape. Once the shape recognition process is completed, as described hereinbelow, the rule may then be applied.

Figure 4:
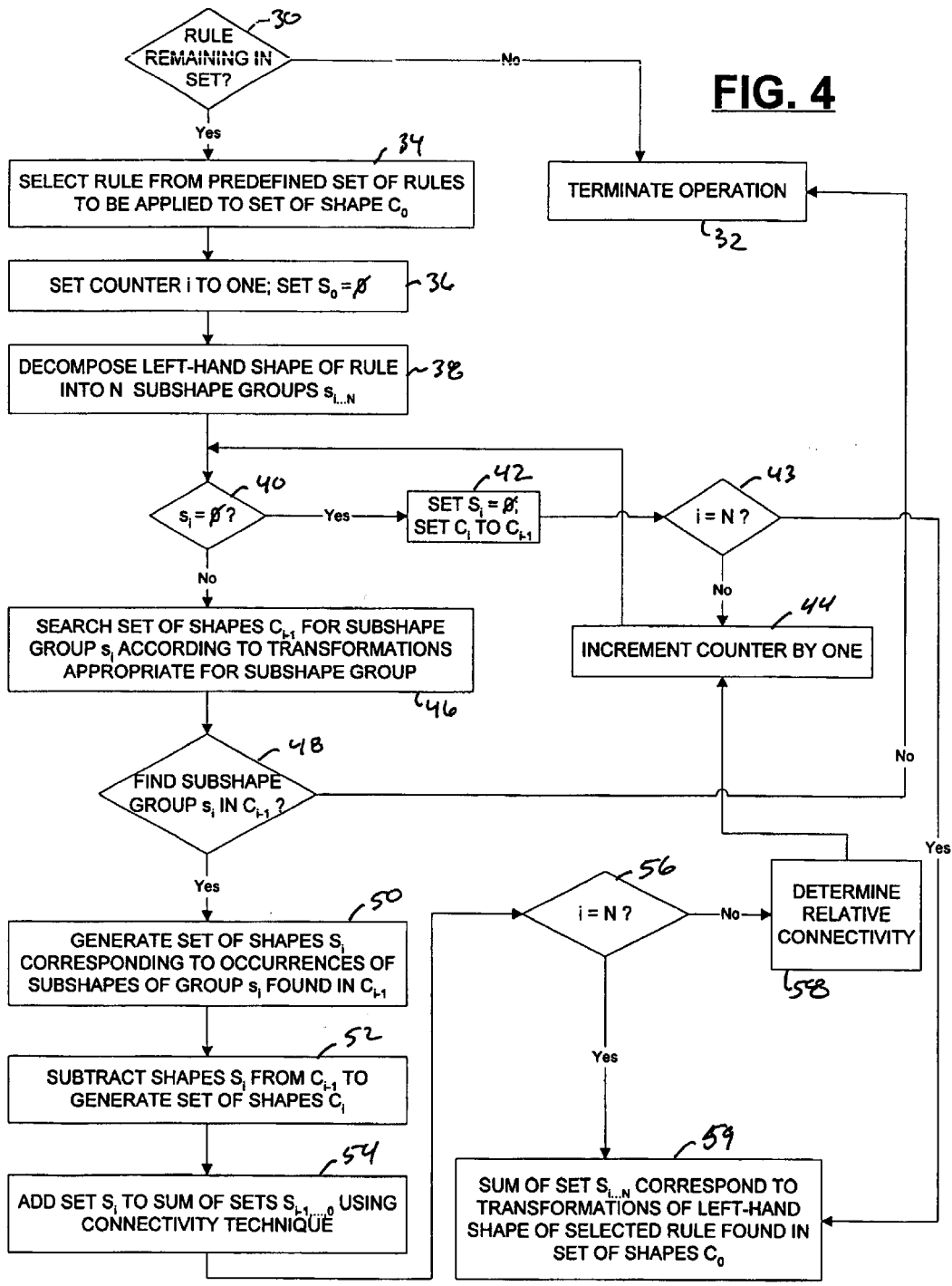
FIG. 4 is a block diagram of the process flow through the parametric shape grammar interpreter of the shape grammar system of FIG. 1 according to one embodiment of the present invention.
Figure 5:
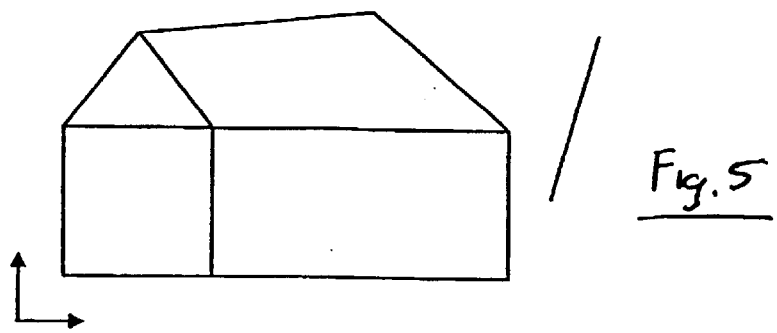
FIGS. 5–11 are diagrams illustrating a method of shape decomposition according to one embodiment of the present invention.

FIG. 4 is a block diagram of the process flow through the parametric shape grammar interpreter 12 according to one embodiment of the present invention. The process begins at block 30 with a determination of whether a rule remains in a set of shape grammar rules for which the left-hand shape of the rule has not been searched in the set of shapes $C_0$. The set of shape grammar rules may be defined and input to the system 10 by a user of the system 10 and may be, for example, architectural shape grammar rules, engineering shape grammar rules, or industrial design shape grammar rules. The set of rules may include one or a multitude of rules. In addition, the set of shapes $C_0$ may include one shape or a multitude of shapes. If the set does not contain any such rules, the process flow continues to block 32, and the operation of the shape grammar interpreter 12 is terminated.

Conversely, if the set does contain such a rule, the process flow continues to block 34, where the rule is selected to be applied, if applicable as determined by the parametric shape grammar interpreter 12, to the set of shapes $C_0$. From block 34, the process flow advances to block 36, where a counter, denoted as i, is set to a value of one. In addition, at block 36, the set of shapes $S_0$, as discussed hereinbelow, is set to null.

From block 36, the process advances to block 38, where the left-hand shape of the rule is decomposed into a number, denoted N, of subshape groups, denoted $s_{i \ldots N}$. The subshape groups may be defined such that no subshapes of the decomposed left-hand shape share, for example, the same line segment. According to one embodiment, the subshape groups $s_{i \ldots N}$ may be of a hierarchical order of decreasing constraints, such as the default hierarchy described hereinbefore with respect to Table 1, or the hierarchy may be defined by a user of the system 10. According to other embodiments, the subshape groups are not ordered according to a hierarchical order.

From block 38, the process continues to block 40, where it is determined whether the subshape group $s_i$ is null. This corresponds to a determination of whether the left-hand shape of the rule includes a subshape belonging to the $s_i$ subshape group. For example, where i=1, it is determined whether the left-hand rule includes a subshape of the $s_1$ group. If the group $s_i$ is null, the process advances to block 42, where the set of shapes $S_i$, as described further hereinbelow, is set to null. In addition, at block 42, the set of shapes $C_i$, as described hereinbelow, is set to the same as the set $C_{i-1}$.

From block 42, the process flow advances to block 43, where it is determined whether i=N. If i does not equal N, then the process flow continues to block 44, where the counter (i) is incremented by one, and the process flow returns to block 40 such that it may be determined whether the subshape group $s_{i+1}$ is null. Conversely, if it is determined that i equals N, then the process flow advances to block 59.

If at block 40 it is determined that the $s_i$ subshape group is not null, the process flow continues to block 46, where the set of shapes $C_{i-1}$ is searched for subshapes belonging to the subshape group $s_i$. For example, where i=1, the set of shapes $C_0$ is searched for subshapes belonging to the subshape group $s_1$. Accordingly, as the counter i is incremented during the process flow, as described hereinbelow, the set of shapes to be searched ($C_{0...N-1}$) will be progressively searched for subshapes belonging to the other subshape groups until all the subshape groups are exhausted.

The set of shapes $C_{i-1}$ is searched for subshapes belonging to the group $s_i$ using the parametric transformations appropriate for that group. For example, for the default subshape group described hereinbefore with respect to Table 1 where i=1, the set of shapes $C_0$ is searched for subshapes of the group $s_i$ using translation, rotation, and isotropic scaling. Accordingly, where i=2, the set of shapes $C_1$ is searched for subshapes of the group $s_2$ using translation, rotation, and anisotropic scaling, and so on for the remaining subshape groups $s_3$ and $s_4$.

From block 46, the process continues to block 48, where it is determined whether a parametric transformation of a subshape belonging to the group $s_i$ is found in the set of shapes $C_{i-2}$. For example, where i=1, it is determined whether a parametric transformation of a subshape belonging to the group $s_1$ is found in the set of shapes $C_0$. If a subshape belonging to the group $s_i$ is not found in the set of shapes $C_{i-1}$, the process flow returns to block 32, where the operation of the parametric shape grammar interpreter 12 is terminated. The process flow is terminated at this point because a subshape belonging to the group $s_i$ is not found in the set of shape $C_{i-1}$, and if the subshape group $s_i$ is not null, then the left-hand shape of the selected rule cannot be found in the set of shapes $C_0$. Conversely, if at block 48 a parametric transformation of a subshape belonging to the group $s_i$ is found, then the process continues to block 50.

At block 50, a set of shapes $S_i$ is generated. The set of shapes $S_i$ includes the parametric transformations of the subshapes of the group $s_i$ found in the set of shapes $C_{i-1}$ using the transformations appropriate for that subshape group. For example, where i=1, a set of shapes $S_1$ is generated which includes the parametric transformations of the subshapes of the group $s_1$ found in the set of shapes $C_0$. For subshape groups that are null, the set $S_i$ is set to be a null, as described hereinbefore with respect to block 42.

Continuing to block 52, a set of shapes $C_i$ is generated which corresponds to the subtraction of the set of shapes $S_i$ from the set of shapes $C_{i-1}$. Thus, for example, where i=1, at block 52 the set of shapes $C_1$ is generated which corresponds to the subtraction of the set of shapes $S_1$ from the set of shapes $C_0$. For subshape groups that are null, the set $C_i$ is set to be the same as $C_{i-1}$, as described hereinbefore with respect to block 42.

From block 52, the process continues to block 54, where the set of shapes $S_i$ are added to the sum of sets $S_{i-1,...,0}$. The set of shapes $S_i$ is added to the previous sum such that the connectivity of the decomposed left-hand shapes is maintained using, for example, the connectivity technique described herein. Thus, for example, where i=1, the set of shapes $S_1$ is added to the set of shapes $S_0$, which was set to null as described hereinbefore with respect to block 36. Accordingly, the sum of the sets $S_1$ and $S_0$ will be the same as $S_1$. The set $S_1$ will also be null if the group $s_1$ is null. Conversely, if $s_1$ is not null and if at block 48 parametric transformations of the subshapes belonging to the group $s_1$ are found in the set $C_0$, then the set $S_1$ will include those shapes corresponding to those parametric transformations. Accordingly, where i=2, the sum of sets $S_{2,1,0}$ will correspond to the sum of sets $S_2$ and $S_1$.

From block 54, the process flow continues to block 56, where it is determined whether i=N. This determination corresponds to a check of whether parametric transformations of the subshapes of each of the subshape groups $S_{i...N}$ that are not null have been searched for.

If i does not equal N, then the process flow advances to block 58, where the connectivity of the subshapes of set $S_i$ relative to the set of shapes $C_i$, as well as the relative connectivity between the other parts of the decomposed left-hand shape, are determined. The relative connectivity of the parts of the left-hand shape may be determined by, for example, identifying with labels or weights the overlapping points of the subshapes of groups $s_1, s_2, \ldots, s_i$, and the subshape of the next group that is not null. In addition, the points in the shapes of set $C_i$ corresponding in location to the transformed, identified points in the groups $s_1, s_2, \ldots, s_i$, may also be identified with, for example, labels or weights. From block 58, the process flow returns to block 44, where the counter (i) is incremented such that the shape recognition function may resume with the subshapes of the next subshape group.

It should be recognized that prior to advancement of the process flow to decision block 56, the set of shapes $C_i$ has been generated at either block 42 or 52, as described hereinbefore. At block 42, the set $C_i$ is set to be the set $C_{i-1}$ because the set $s_i$ is null. Accordingly, when the process flow returns to block 46 (assuming the group $s_{i+1}$ is not null), in essence the set of shapes $C_{i-1}$ will be searched for the subshapes of group $s_{i+1}$. Conversely, if at block 48, a parametric transformation of a subshape of the group $s_i$ was found in the set of shapes $C_{i-1}$, then the set of shapes $C_i$ is generated at block 52, as described hereinbefore, as the set of shapes $S_i$ subtracted from the set of shapes $C_{i-1}$. Accordingly, when the process flow continues to block 46, the set of shapes $S_i$ subtracted from the set of shapes $C_{i-1}$ (i.e., the set of shapes $C_i$) will be searched for subshapes of the group $s_{i+1}$ (again, assuming the group $s_{i+1}$ is not null).

If at block 56 it is determined that i=N, which corresponds to a determination that the presence of parametric transformations of subshapes belonging to each of the subshape groups $S_{i...N}$ which are not null have been searched for, then the process flow proceeds to block 59, where the sum of sets $S_{i...N}$, as determined at block 54, corresponds to the parametric transformations of the left-hand shape of the selected rule found in the set of shapes $C_0$.

According to other embodiments of the present invention, the interpreter 12 may recognize parametric transformations of the left-hand shape of a selected rule according to process flows different than that illustrated in FIG. 4. For example, according to another embodiment, rather than adding the set of shapes $S_i$ to the sum of $S_{i-1...0}$ at block 54 prior to the determination of whether i=N at block 56, the sets $S_{i...N}$ may be summed together in one step after the determination of whether i=N to recognize the parametric transformations of the left-hand shape of the rule in the set of shapes $C_0$.

Once the parametric transformations of the left-hand shape of a selected rule is recognized in the set of shapes $C_0$ by the parametric shape grammar interpreter 12, as described hereinbefore with reference to FIG. 4, it may be determined whether the rule is to be applied to the set of shapes $C_0$. This determination may be made, for example, by an operator of the system 10 or the intelligent rule selection module 20. If a particular application of the rule is selected, the rule application module 18 may then apply the rule by subtracting the transformation of the left-hand shape of the rule from the initial shape and adding a transformation of the right-hand shape. After the rule is applied, the process flow illustrated in FIG. 4 may be repeated with the selection of a different rule from the set of predefined rules to be applied to the resulting shape (or shapes) from the application of the prior rule. If it is determined that the rule is not to be applied, the process flow illustrated in FIG. 4 may also be repeated with the selection of a new rule from the set of predefined rules to be applied to the original shape or shapes ($C_0$). According to another embodiment, the rule application module 18 may apply the rule for all transformations of the left-hand shape found in the set of shapes $C_0$, and the process may be repeated for all of the resulting shapes, thus producing all possible permutations resulting from application of the predefined set of rules in the initial design shape(s).

The I/O interface module 22 may be used to input data, such as the shape grammar rules, and to output data, such as the set of rules, the transformations of the left-hand shape of a particular rule found in a shape, and the shapes resulting from the application from a particular rule. The I/O interface module 22 may input and output the data, for example, in text and/or graphical form. The I/O interface module 22 may display data via a display device (not shown) in communication with the I/O interface module 22.

Thus, the parametric shape grammar interpreter 12 of the present invention permits parametric shape recognition of the left-hand shape of a shape grammar rule in an initial design shape(s). Unlike previous interpreters that are limited to Euclidean transformations (translation, rotation, and scaling) that can only be applied to whole shapes, the parametric shape grammar interpreter 12 can search for general parametric features of a subshape generated through decomposition of a shape, thus allowing for separate treatment of each subshape.

Figure 6:
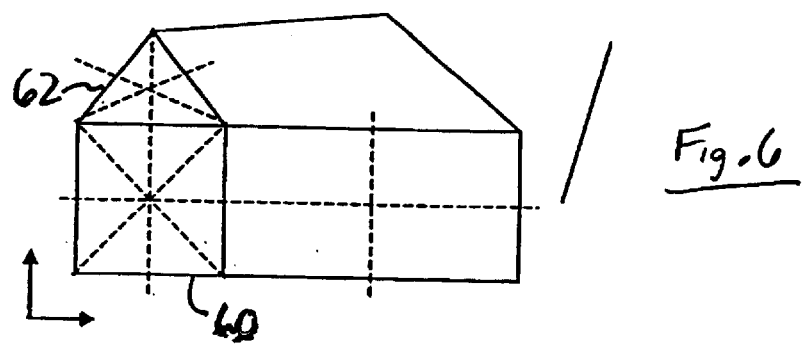

FIGS. 5–11 provide a shape decomposition example using the example default hierarchy of subshape groups defined hereinbefore with respect to Table 1. Consider the shape to be decomposed (such as the shape a in the rule a→b) to be that illustrated in FIG. 5. To recognize the transformations of the subshapes of the groups $s_{1-4}$, as defined hereinbefore, the lines of symmetry in the shape of FIG. 5 may first be determined. These lines of symmetry are illustrated in FIG. 6 as dashed lines. As illustrated in FIG. 6, each line of the square 60 is symmetric with the two lines of the square 60 that it intersects. In addition, each of the lines of the triangle 62 is symmetric with more than one line. Accordingly, these subshapes satisfy the requirements of the subshape group $s_1$, and can be subtracted from the example shape, resulting in the shape shown in FIG. 7, for which the subshapes of group $s_2$ may be searched.

Figure 7:
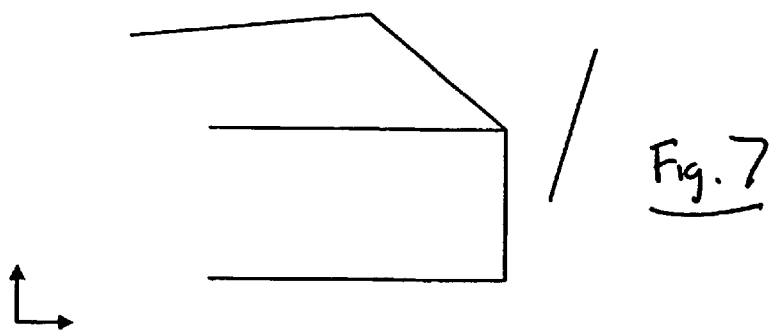
Figure 8:
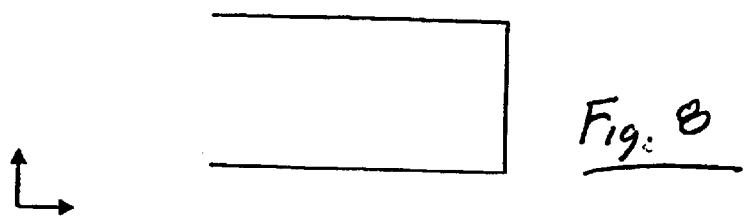

The resulting shape, shown in FIG. 7, contains two lines that are symmetric to only one other line. Additionally, there are two perpendicular intersections, comprised of three line segments, that satisfy the requirements of $s_2$, as illustrated in FIG. 8. Accordingly, this shape may be subtracted from the shape shown in FIG. 7, resulting in the shape shown in FIG. 9, which may be searched for subshapes of the group $s_3$.

Figure 9:
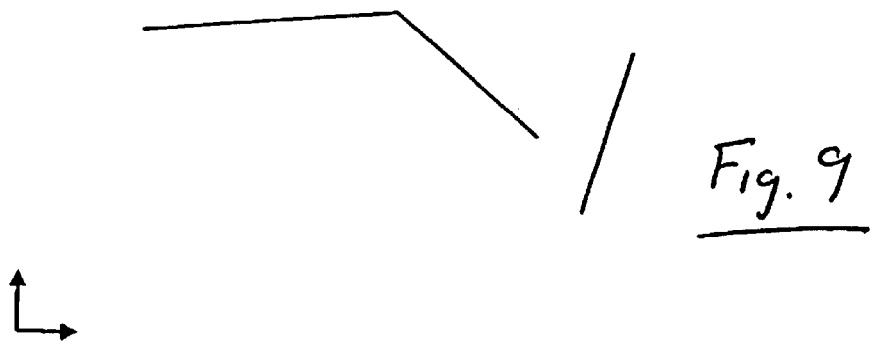
Figure 10:
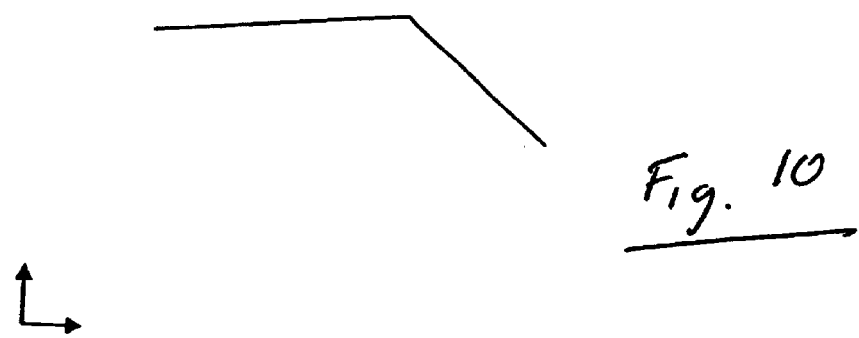
Figure 11:
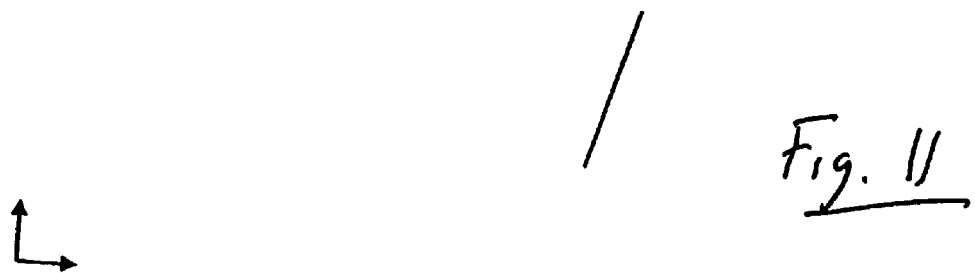

The $s_3$ subshape illustrated in FIG. 10 is present in the shape of FIG. 9. As illustrated, the $s_3$ subshape is simply the intersecting line segments. Accordingly, this subshape may be subtracted from the shape of FIG. 9, resulting in the shape shown in FIG. 11, which corresponds to the subshapes comprising the $s_4$ group.

FIGS. 12–19 provide an example of parametric shape recognition, using the example default hierarchy defined hereinbefore with respect to Table 1, to recognize the presence of parametric transformations of the left-hand shape (a) of the rule (a→b) in a design shape ($C_0$). Consider the rule to be the rule a→b illustrated in FIG. 12, and consider the initial design shape ($C_0$) to which the rule is to be applied to be the shape illustrated in FIG. 13. As described hereinbefore, in order to apply the rule a→b to the design shape $C_0$, the left hand shape (a) of the rule must be found to be a parametric subshape under various transformations (τ) of the shape $C_0$. Using the default hierarchy defined hereinbefore with respect to Table 1, the shape a may be decomposed into the four subshapes where $a=s_1+s_2+s_3+s_4$.

For the shape a shown in FIG. 12, using the default hierarchy defined hereinbefore with respect to Table 1, the subshapes comprising groups $s_1$ and $s_2$ are shown in FIG. 14, and the groups $s_3$, $s_4$ are null. The shape recognition process, as described hereinbefore, may begin with the most constrained subshape group that is not null and skipped any less constrained groups that are null. Such an embodiment produces a more efficient shape recognition process because the more highly constrained shapes have fewer possible transformations. Thus, for the rule shown in FIG. 12, the $s_1$ subshape is searched first, and then the $s_2$ subshape is searched.

Figure 16:
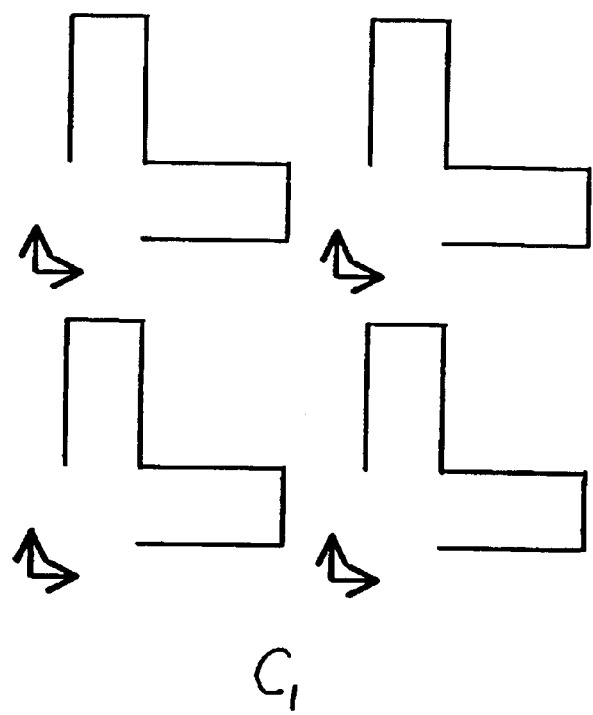

Permissible transformations of the $s_1$ subshape may be found multiple times in the shape a, resulting in four instances of $s_1$ subshapes in this example. These transformations, as described hereinbefore, are defined as the set $S_1$, and are shown in FIG. 15. The four shapes of $S_1$ are equal but are found differently within the initial design shape by the rotation of $s_1$ subshape four different ways (0°, 90°, 180°, and 270°). The dots in FIG. 15 are to show the various transformations of the $s_1$ subshape found in the shape a. Having found the set of shapes $S_1$, the set of shapes $C_1$ is generated, which is the result of the set of shapes $S_1$ subtracted from $C_0$. The set of shapes $C_1$ is shown in FIG. 16.

Figure 17:
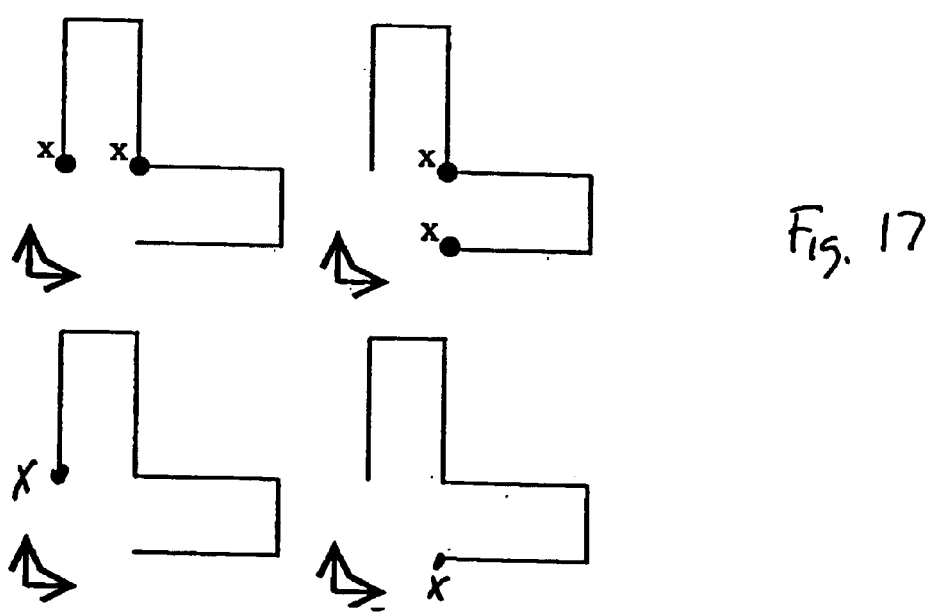

By definition of the subshape groups $s_1$, $s_2$, $s_3$, and $s_4$, it can been seen that no two groups will share any common line segments. They will, however, share common line segment end points. Accordingly, the relative connectivity of the shapes of groups $s_1$ and $s_2$, as well as the relative connectivity of the transformed instance of $s_1$ and the set of $C_1$ shapes may be identified, as illustrated in FIG. 17.

Next, as described hereinbefore, the set of shapes $C_1$ is searched for the next most constrained subshape group, which for this example, is the $s_2$ group. As can be appreciated, two permissible transformations of the $s_2$ subshape may be found in each of the shapes of $C_1$. The set of the subshapes thus define the set $S_2$. Next, as described hereinbefore, the set of shapes $S_2$ is subtracted from the set of shapes $C_1$ to define the set of shapes $C_2$. Next, the intersection points between the marked shapes $S_2$ and the corresponding shapes $C_2$ are identified.

Figure 18:
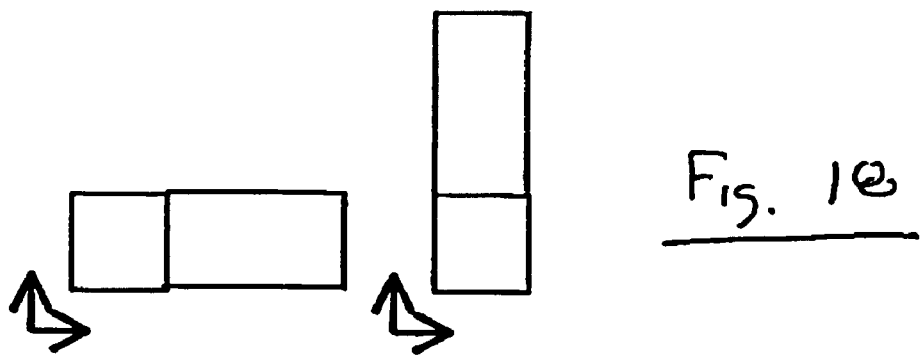
Figure 19:
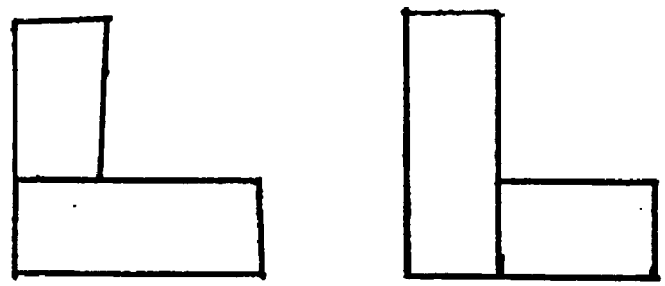
Figure 23:
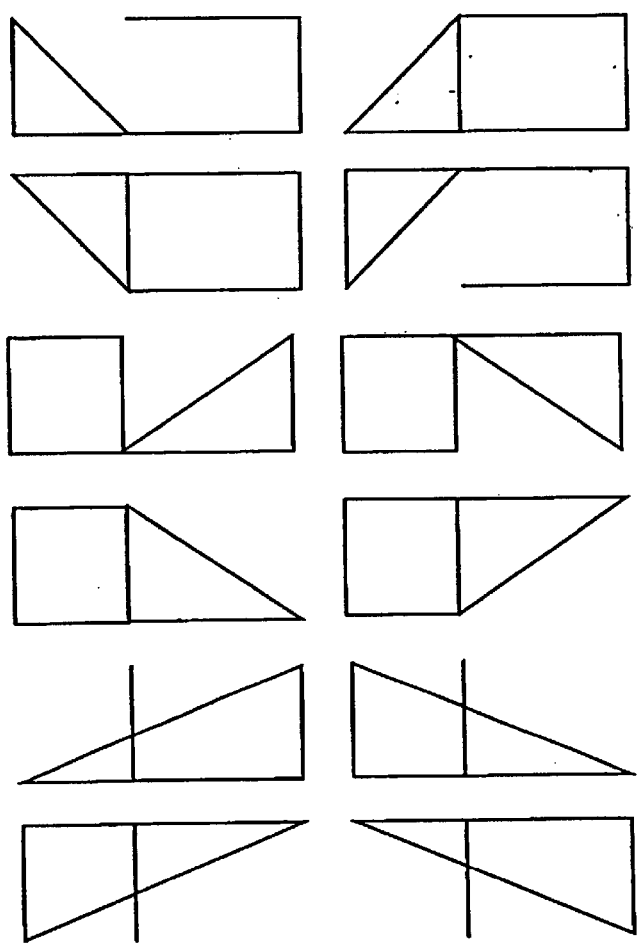
Figure 24:
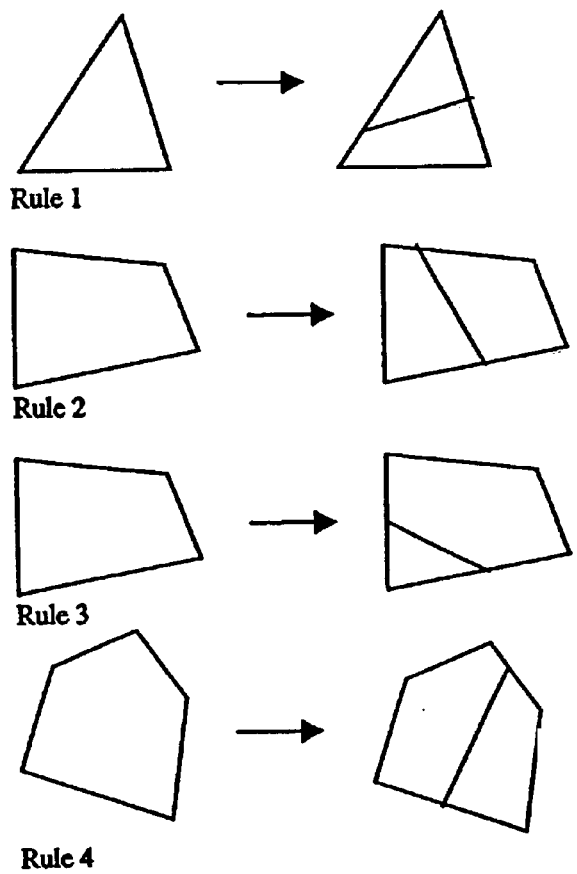
Figure 25:
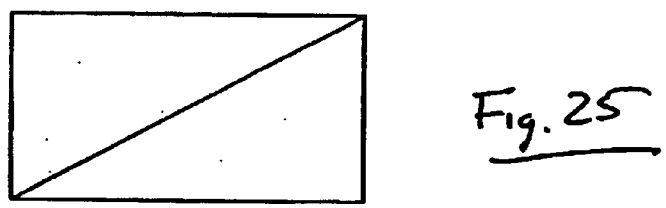

The sets $S_1$ and $S_2$ are then added such that their connectivity is maintained to produce the subshapes illustrated in FIG. 18. Because the groups $s_3$ and $s_4$ are null, as described hereinbefore, the shapes illustrated in FIG. 18 represent the parametric transformations of the left-hand shape a of the rule a→b (illustrated in FIG. 12) found in the initial design shape $C_0$ (illustrated in FIG. 13). The two possible applications of the rule may then be applied to the shape $C_0$ to produce the shapes illustrated in FIG. 19.

FIGS. 20–23 provide an example of parametric rule application. Consider the rule to be applied as the rule a→b illustrated in FIG. 20, and the initial design shape $C_0$, to which the rule is to be applied, as the shape illustrated in FIG. 21. Using the default hierarchical subshape groups described hereinbefore with respect to Table 1, it can be recognized that the left-hand shape (a) of the rule has constraints that limit the parametric shape search to perpendicular intersections. This corresponds to group $s_2$. Twelve permissible transformations of the $s_2$ shape may be found in the shape $C_0$, three of which are shown in bold in FIG. 22. Because the subshape groups $s_1$, $s_3$, and $s_4$ are null for this example, the sum of sets $S_{1-4}$ includes only the twelve transformations of the $s_2$ subshape found in the shape $C_0$. Accordingly, the shape a may be recognized twelve times in the shape $C_0$, with application of the rule for each of the transformations resulting in the shapes illustrated in FIG. 23.

FIGS. 24–27 provide another example of a parametric shape grammar application using the default hierarchy of subshape groups described hereinbefore with respect to Table 1. For the example, the set of rules illustrated in FIG. 24 comprise the predefined shape grammar rules, and the initial design shape is the shape illustrated in FIG. 25. Upon examining each of the rules, it can be recognized that the left-hand shapes of each rule fall into the $s_3$ group because of the lack of symmetry and perpendicular intersections. Therefore, in general, each of the rules may be applied if a shape corresponding to a permissible parametric transformation of the left-hand shape of any of the rules is recognized in the initial design shape. For example, rule 1 is applicable if any triangle can be recognized, and rule 4 may be applied if any five-sided polygon can be recognized. The progression of shapes illustrated in FIG. 26 depict the application of a series of these rules using the parametric shape grammar interpreter 12 for shape recognition. For the shapes illustrated in FIG. 26, the subshape to which the indicated rule is to be applied is highlighted in bold. The progression of rule application may continue, such as by randomly choosing the applicable rules as well as the parameters, producing final design shapes such as those illustrated in FIG. 27.

Those of ordinary skill in the art will recognize that many modifications and variations of the present invention may be implemented. The foregoing description and the following claims are intended to cover all such modifications and variations.

What is claimed is:

1. A parametric shape interpreter, comprising:
    a shape decomposition module for decomposing a first shape into a group of subshapes arranged in a hierarchical order; and
    a shape recognition module in communication with the shape decomposition module for searching a second shape for said subshapes.

2. The parametric shape interpreter of claim 1, wherein the shape decomposition module is for decomposing a left-hand shape of a shape grammar rule into at least one subshape belonging to one of a plurality of subshape groups.

3. The parametric shape interpreter of claim 2, wherein the subshape groups have a hierarchical order of decreasing constraints.

4. The parametric shape interpreter of claim 2, wherein the shape decomposition module is for decomposing a two-dimensional left-hand shape of a shape grammar rule into one or more subshapes.

5. The parametric shape interpreter of claim 2, wherein the shape decomposition module is for decomposing a three-dimensional left-hand shape of a shape grammar rule into one or more subshapes.

6. The parametric shape interpreter of claim 2, wherein the shape decomposition module is for decomposing a one-dimensional left-hand shape of a shape grammar rule into one or more subshapes.

7. The parametric shape interpreter of claim 2, wherein the shape recognition module is for searching said second shape for a parametric transformation of the subshape.

8. The parametric shape interpreter of claim 2, wherein the shape recognition module is for recognizing a parametric transformation of the left-hand shape of the shape grammar rule in said second shape by searching said second shape for a parametric transformation of the subshape.

9. The parametric shape interpreter of claim 8, wherein the shape recognition module is for recognizing a parametric transformation of the left-hand shape of the shape grammar rule in said second shape by progressively searching for a parametric transformation of a subshape belonging to each of the subshape groups that is not null and subtracting the parametric transformation from said second shape.

10. A shape grammar system, comprising:
    a parametric shape grammar interpreter for recognizing parametric transformations of a first shape in a second shape, said interpreter comprising a shape decomposition module for decomposing said first shape into a group of subshapes arranged in a hierarchical order and a shape recognition module in communication with the shape decomposition module for searching said second shape for said subshapes; and
    a rule application module in communication with the parametric shape grammar interpreter.

11. The shape grammar system of claim 10, wherein the shape decomposition module is for decomposing a left-hand shape of a shape grammar rule into at least one subshape belonging to one of a plurality of subshape groups.

12. The shape grammar system of claim 11, wherein the subshape groups have a hierarchical order of decreasing constraints.

13. The shape grammar system of claim 11, wherein the shape recognition module is for recognizing a parametric transformation of the left-hand shape of the shape grammar rule in said second shape by searching said second shape for a parametric transformation of the subshape.

14. The shape grammar system of claim 13, wherein the shape recognition module is for recognizing a parametric transformation of the left-hand shape of the shape grammar rule in said second shape by progressively searching for a parametric transformation of a subshape belonging to each of the subshape groups that is not null and subtracting the parametric transformation of the subshape from said second shape.

15. The shape grammar system of claim 13, wherein the rule application module is for applying the shape grammar rule by subtracting the parametric transformation of the left-hand shape of the shape grammar rule from said second shape and substituting therefore a transformation of a right-hand shape of the shape grammar rule.

16. The shape grammar system of claim 10, further comprising an intelligent rule selection module in communication with the parametric shape grammar interpreter.

17. A parametric shape grammar interpreter, comprising:
    means for decomposing a left-hand shape of a shape grammar rule into at least one subshape belonging to one of a plurality of subshape groups having a hierarchical order of decreasing constraints; and
    means for recognizing a parametric transformation of the left-hand shape of the shape grammar rule in a first shape by progressively searching for a parametric transformation of a subshape belonging to each of the subshape groups that is not null and subtracting the parametric transformation of the subshape from the first shape, said mean for recognizing including means for adding a parametric transformation of a first subshape found in the first shape belonging to a first of the subshape groups and a parametric transformation of a second subshape found in a second shape belonging to a second of the subshape groups, wherein the second shape corresponds to the transformed first subshape subtracted from the first shape.

18. A parametric shape interpreter, comprising:
means for decomposing a first shape into at least one subshape belonging to one of a plurality of subshape groups arranged in a hierarchical order; and
means for recognizing a parametric transformation of the first shape in a second shape by searching the second shape for a parametric transformation of the subshapes comprising said first shape.

19. A method of recognizing parametric transformations of a left-hand shape of a shape grammar rule in a fist shape, comprising:
decomposing the left-hand shape of the shape grammar rule into at least one subshape belonging to one of a plurality of subshape groups having a hierarchical order of decreasing constraints;
progressively searching for a parametric transformation of a subshape belonging to each of the subshape groups that is not null and subtracting the parametric transformation from a first shape; and
adding a parametric transformation of a first subshape found in the first shape belonging to a first of the subshape groups and a parametric transformation of a second subshape found in a second shape belonging to a second of the subshape groups, wherein the second shape corresponds to the transformed first subshape subtracted from the first shape.

20. A method of recognizing parametric transformations of a left-hand shape of a shape grammar rule in a first shape, comprising:
searching the first shape for a parametric transformation of a first subshape, from a group of subshapes arranged in a hierarchical order, of the left-hand shape of the shape grammar rule;
generating a second shape corresponding to the parametric transformation of the first subshape, found in the first shape, subtracted from the first shape;
searching the second shape for a parametric transformation of a second subshape from said group of subshapes of the left-hand shape of the shape grammar rule; and
adding the parametric transformation of the first subshape found in the first shape to a parametric transformation of the second subshape found in the second shape.

21. The method of claim 20, further comprising:
generating a third shape corresponding to the parametric transformation of the second subshape subtracted from the second shape;
searching the third shape for a parametric transformation of a third subshape from said group of subshapes of the left-hand shape of the shape grammar rule; and
adding the parametric transformation of the third subshape found in the third shape to a sum of the parametric transformation of the first subshape found in the first shape and the parametric transformation of the second subshape found in the second shape.

22. The method of claim 20, further comprising:
subtracting a sum of the parametric transformation of the first subshape found in the first shape and the parametric transformation of the second subshape found in the second shape from the first shape; and
adding a corresponding transformation of a right-hand shape of the shape grammar rule to the first shape.

23. A method of recognizing a first shape in a second shape, comprising:
decomposing the first shape into at least one subshape belonging to one of a plurality of hierarchically arranged subshape groups; and
searching the second shape for a parametric transformation of the subshapes comprising said first shape.

24. The method of claim 23, wherein searching the second shape includes progressively searching the second shape for a parametric transformation of a subshape belonging to each of the subshape groups that are not null and subtracting the parametric transformation of the subshape from the second shape.

25. A method, comprising:
decomposing a first shape into a plurality of subshapes;
searching in a hierarchical manner in a second shape for said plurality of subshapes; and
identifying instances of said subshapes in said second shape based on said searching.

26. The method of claim 25 additionally comprising applying a rule when said first shape is identified in said second shape.

27. A method, comprising:
decomposing a first shape into a plurality of hierarchically ordered subshapes;
searching in a second shape for said plurality of subshapes; and
identifying instances of said subshapes in said second shape based on said searching.

28. The method of claim 27 additionally comprising applying a rule when said first shape is identified in said second shape.

29. An automated method, comprising:
decomposing a first shape into a plurality of subshapes;
searching in a hierarchical manner in a series of second shapes for said plurality of subshapes; and
identifying instances of said subshapes in said series of second shapes based on said searching.

30. The method of claim 29 wherein said series of second shapes is derived by subtracting an identified subshape from a previous second shape.

31. The method of claim 29 additionally comprising applying a rule when all of said plurality of subshapes from said first shape are identified in said series of second shapes.

32. An automated method, comprising:
decomposing a first shape into a plurality of hierarchically ordered subshapes;
searching in a series of second shapes for said plurality of subshapes; and
identifying instances of said subshapes in said series of second shapes based on said searching.

33. The method of claim 32 wherein said series of second shapes is derived by subtracting an identified subshape from a previous second shape.

34. The method of claim 32 additionally comprising applying a rule when all of said plurality of subshapes from said first shape are identified in said series of second shapes.

* * * * *

UNITED STATES PATENT AND TRADEMARK OFFICE
CERTIFICATE OF CORRECTION

| | | |
|---|---|---|
| PATENT NO. | : 7,050,051 B1 | Page 1 of 1 |
| APPLICATION NO. | : 09/493903 | |
| DATED | : May 23, 2006 | |
| INVENTOR(S) | : Jay P. McCormack and Jonathan Cagan | |

It is certified that error appears in the above-identified patent and that said Letters Patent is hereby corrected as shown below:

Column 1, Line 24, delete "generatedesigns" and substitute therefore -- generate designs --.

Column 7, Line 14, delete "$s_i$" and substitute therefore -- $s_1$ --.

Column 7, Line 22, delete "$C_{i-2}$" and substitute therefore -- $C_{i-1}$ --.

Signed and Sealed this

Seventeenth Day of June, 2008

JON W. DUDAS
*Director of the United States Patent and Trademark Office*